US005647215A

United States Patent [19]

Sharifi et al.

[11] Patent Number: 5,647,215

[45] Date of Patent: Jul. 15, 1997

[54] GAS TURBINE COMBUSTOR WITH TURBULENCE ENHANCED MIXING FUEL INJECTORS

[75] Inventors: Mehran Sharifi, Winter Springs; Mitchell O. Stokes, Orlando, both of Fla.; David T. Foss, Austin, Tex.

[73] Assignee: Westinghouse Electric Corporation, Pittsburgh, Pa.

[21] Appl. No.: 554,684

[22] Filed: Nov. 7, 1995

[51] Int. Cl.$^{6}$ .................................................. F02C 1/00

[52] U.S. Cl. ................................ 60/737; 60/749; 60/746; 239/431; 239/DIG. 7

[58] Field of Search ............................ 60/737, 738, 740, 60/742, 743, 746, 747, 749; 239/431, 432, DIG. 7

[56] References Cited

U.S. PATENT DOCUMENTS

| | | | |
|---|---|---|---|
| 520,796 | 4/1894 | Washam et al. | 60/746 |
| 2,850,875 | 6/1958 | Gahwler | 60/746 |
| 3,328,958 | 7/1967 | Canuel | 60/749 |
| 3,455,108 | 7/1969 | Clare et al. | 60/749 |
| 3,535,875 | 10/1970 | Sneeden et al. | 60/738 |
| 3,958,416 | 5/1976 | Hammond, Jr. et al. | 60/39.65 |
| 4,072,470 | 2/1978 | Tsuto et al. | 239/431 |
| 4,193,260 | 3/1980 | Carlisle et al. | 60/746 |
| 5,101,633 | 4/1992 | Keller et al. | 60/742 |
| 5,127,221 | 7/1992 | Beebe | 60/39.02 |
| 5,218,824 | 6/1993 | Cederwall et al. | 60/742 |
| 5,259,184 | 11/1993 | Borkowicz et al. | 60/737 |
| 5,359,847 | 11/1994 | Pillsbury et al. | 60/39.06 |
| 5,394,688 | 3/1995 | Amos | 60/39.23 |
| 5,408,825 | 4/1995 | Foss et al. | 60/39.463 |
| 5,471,840 | 12/1995 | Lovett | 60/737 |

FOREIGN PATENT DOCUMENTS

| | | | |
|---|---|---|---|
| 0 455 487 A1 | 6/1991 | European Pat. Off. . | |
| 2562211 | 10/1985 | France | 60/743 |
| 1099959 | 1/1968 | United Kingdom . | |

*Primary Examiner*—Timothy Thorpe
*Assistant Examiner*—Ted Kim

[57] ABSTRACT

A combustor for a gas turbine having primary and secondary combustion zones. The combustor has primary gas fuel spray pegs for supplying a lean mixture of gaseous fuel to the primary combustion zone via a first annular pre-mixing passage and secondary fuel spray bars for supplying a lean mixture of fuel to the secondary combustion zone via a second annular pre-mixing passage. The fuel spray bars are aerodynamically shaped and a row of fuel discharge ports are formed on opposing sides of the spray bar. A pair of mixing fins project outwardly from the spray bar sides. The fins create turbulence in the air flow that ensures adequate mixing of the fuel and air. The fins have sufficient height and are displaced sufficiently far from the fuel discharge ports so that although the turbulence has not dissipated by the time the air flow reaches the fuel discharge ports, the zone of recirculation located downstream from the fins does not extend to the fuel discharge ports. This ensures that the spray bars will not act as flame holders and cause combustion to occur prematurely within the pre-mixing passage.

17 Claims, 4 Drawing Sheets

GAS TURBINE COMBUSTOR WITH TURBULENCE ENHANCED MIXING FUEL INJECTORS

BACKGROUND OF THE INVENTION

The present invention relates to a gas turbine combustor. More specifically, the present invention relates to a low NOx combustor having the capability of burning lean mixtures of gaseous fuel.

In a gas turbine, fuel is burned in compressed air, produced by a compressor, in one or more combustors. Traditionally, such combustors had a primary combustion zone in which an approximately stoichiometric mixture of fuel and air was formed and burned in a diffusion type combustion process. Fuel was introduced into the primary combustion zone by means of a centrally disposed fuel nozzle. Additional air was introduced into the combustor downstream of the primary combustion zone so that the overall fuel/air ratio was considerably less than stoichiometric—i.e., lean. Nevertheless, despite the use of lean fuel/air ratios, the fuel/air mixture was readily ignited at start-up and good flame stability was achieved over a wide range of firing temperatures due to the locally richer nature of the fuel/air mixture in the primary combustion zone.

Unfortunately, use of rich fuel/air mixtures in the primary combustion zone resulted in very high temperatures. Such high temperatures promoted the formation of oxides of nitrogen ("NOx"), considered an atmospheric pollutant. It is known that combustion at lean fuel/air ratios reduces NOx formation. However, achieving such lean mixtures requires that the fuel be widely distributed and very well mixed into the combustion air. This can be accomplished by pre-mixing the fuel into the combustion air prior to its introduction into the combustion zone.

In the case of gaseous fuel, this pre-mixing can be accomplished by introducing the fuel into primary and secondary annular passages that pre-mix the fuel and air and then direct the pre-mixed fuel into primary and secondary combustion zones, respectively. The gaseous fuel is introduced into these primary and secondary pre-mixing passages using cylindrical fuel spray tubes distributed around the circumference of each passage. A combustor of this type is disclosed in U.S. Pat. No. 5,394,688 (Amos), hereby incorporated by reference in its entirety.

The presence of the cylindrical fuel spray tubes in the pre-mixing passages creates turbulence in the air flow immediately downstream of the tubes. Such turbulence is not undesirable since it aids in mixing the fuel and air. However, the recirculation associated with such turbulent zones can cause the fuel spray tube to act as a flame holder, so that combustion occurs prematurely in the pre-mixing passage, rather than in the combustion zone as intended. This situation can cause damage to the fuel tubes and the liners forming the pre-mixing passage.

It is therefore desirable to provide a lean burning gas turbine combustor capable of introducing fuel into a pre-mixing passage with sufficient turbulence to provide mixing but without creating re-circulation zones that could act as flame holders.

SUMMARY OF THE INVENTION

Accordingly, it is the general object of the current invention to provide a lean burning gas turbine combustor capable of introducing fuel into a pre-mixing passage with sufficient turbulence to provide mixing but without creating re-circulation zones that could act as flame holders.

Briefly, this object, as well as other objects of the current invention, is accomplished in a combustor comprising (i) an inlet for receiving compressed air, (ii) a combustion zone, and (iii) fuel pre-mixing means for pre-mixing a fuel into at least a first portion of the compressed air so as to form a fuel/air mixture and for subsequently introducing the fuel/air mixture into the combustion zone. The fuel pre-mixing means includes (i) a passage in flow communication with the inlet and the combustion zone, whereby the first portion of the compressed air flows through the passage, and (ii) a plurality of members projecting into the passage. Each of the members has (i) first and second opposing sides, (ii) a first mixing fin extending outwardly from the first side by a first distance, (iii) a first fuel discharge port formed in the first side, the first fuel port displaced from the first mixing fin in the downstream direction with respect to the flow of the first portion of the compressed air through the passage by a second distance.

DESCRIPTION OF THE PREFERRED EMBODIMENT

Figure 1:
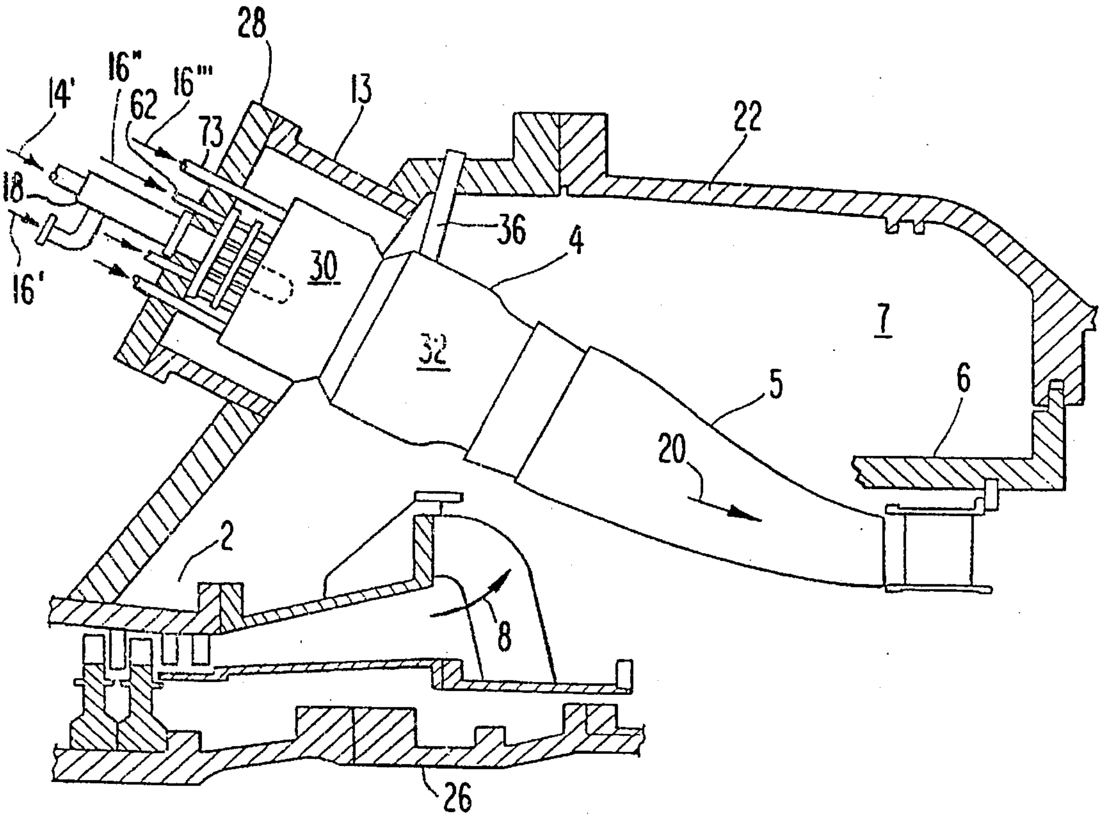
FIG. 1 is a longitudinal cross-section through the combustion section of a gas turbine incorporating the combustor of the current invention.

FIG. 1 shows the combustion section of the gas turbine 1. The gas turbine is comprised of a compressor 2 that is driven by a turbine 6 via a shaft 26. Ambient air is drawn into the compressor 2 and compressed. The compressed air 8 produced by the compressor 2 is directed to a combustion system that includes one or more combustors 4 and a fuel nozzle 18 that introduces both gaseous fuel 16 and oil fuel 14 into the combustor. As is conventional, the gaseous fuel 16 may be natural gas and the liquid fuel 14 may be no. 2 diesel oil, although other gaseous or liquid fuels could also be utilized. In the combustors 4, the fuel is burned in the compressed air 8, thereby producing a hot compressed gas 20.

The hot compressed gas 20 produced by the combustor 4 is directed to the turbine 6 where it is expanded, thereby producing shaft horsepower for driving the compressor 2, as well as a load, such as an electric generator. The expanded gas produced by the turbine 6 is exhausted, either directly to the atmosphere or, in a combined cycle plant, to a heat recovery steam generator and then to atmosphere.

Figure 2:
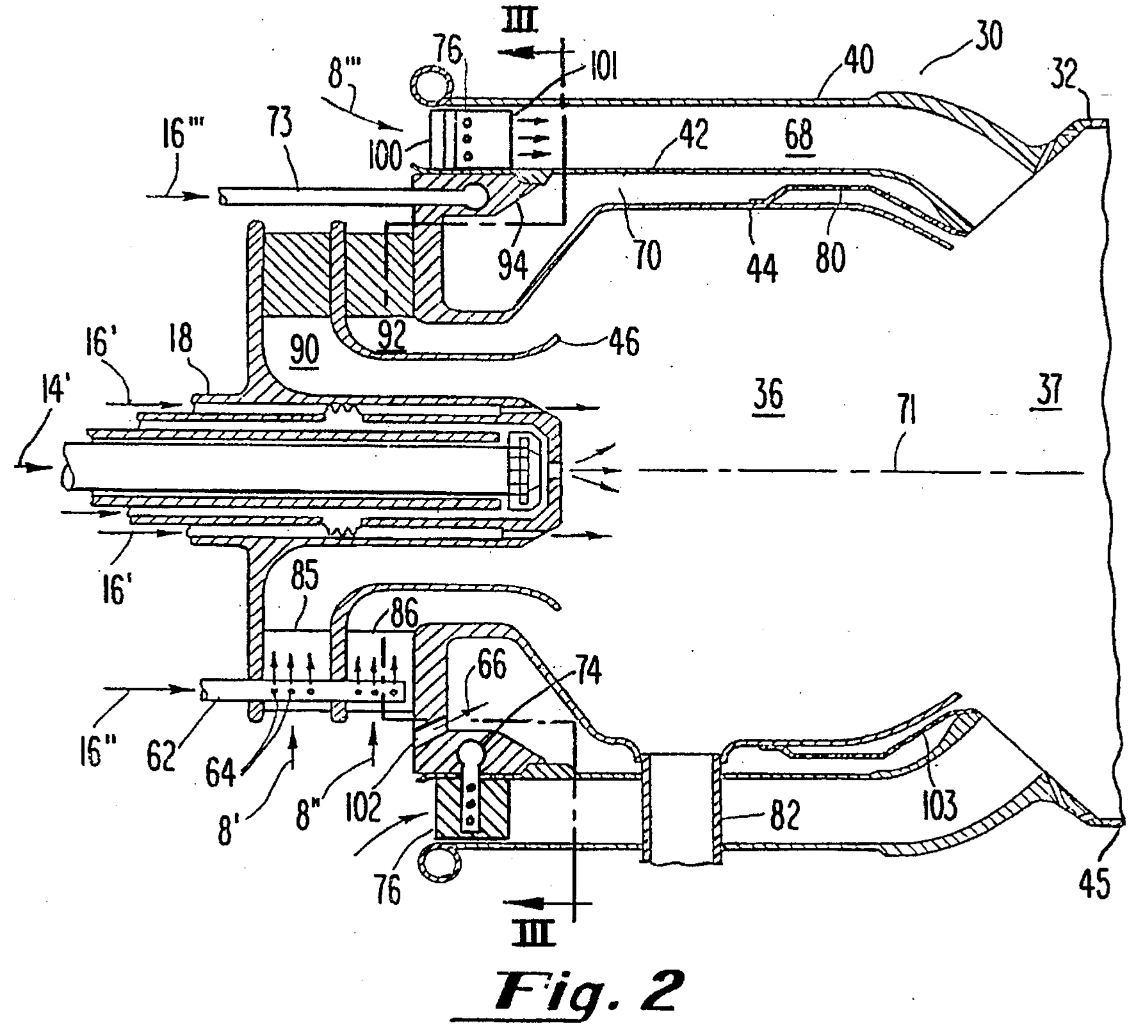
FIG. 2 is a longitudinal cross-section through the combustor shown in FIG. 1, with the cross-section taken through lines II—II shown in FIG. 3.

A circumferential array of combustors 4, only one of which is shown, are connected by cross-flame tubes 82, shown in FIG. 2, and disposed in a chamber 7 formed by a shell 22. Each combustor has a primary section 30 and a secondary section 32. The hot gas 20 exiting from the secondary section 32 is directed by a duct 5 to the turbine section 6. The primary section 30 of the combustor 4 is supported by a support plate 28. The support plate 28 is attached to a cylinder 13 that extends from the shell 22 and encloses the primary section 30. The secondary section 32 is supported by eight arms (not shown) extending from the support plate 28. Separately supporting the primary and secondary sections 30 and 32, respectively, reduces thermal stresses due to differential thermal expansion.

The combustor 4 has a combustion zone having primary and secondary portions. Referring to FIG. 2, the primary combustion zone portion 36 of the combustion zone, in which a lean mixture of fuel and air is burned, is located within the primary section 30 of the combustor 4. Specifically, the primary combustion zone 36 is enclosed by a cylindrical inner liner 44 portion of the primary section 30. The inner liner 44 is encircled by a cylindrical middle liner 42 that is, in turn, encircled by a cylindrical outer liner 40. The liners 40, 42 and 44 are concentrically arranged around an axial center line 71 so that an inner annular passage 70 is formed between the inner and middle liners 44 and 42, respectively, and an outer annular passage 68 is formed between the middle and outer liners 42 and 40, respectively.

An annular ring 94, in which a fuel manifold 74 is formed, is attached to the upstream end of liner 42. The annular ring is disposed within the passage 70—that is, between the fuel pre-mixing passages 92 and 68—so that the presence of the manifold 74 does not disturb the flow of air 8" and 8'" into either of the pre-mixing passages 92 and 68. Cross-flame tubes 82, one of which is shown in FIG. 2, extend through the liners 40, 42 and 44 and connect the primary combustion zones 36 of adjacent combustors 4 to facilitate ignition.

Since the inner liner 44 is exposed to the hot gas in the primary combustion zone 36, it is important that it be cooled. This is accomplished by forming a number of holes 102 in the radially extending portion of the inner liner 44, as shown in FIG. 2. The holes 102 allow a portion 66 of the compressed air 8 from the compressor section 2 to enter the annular passage 70 formed between the inner liner 44 and the middle liner 42. An approximately cylindrical baffle 103 is located at the outlet of the passage 70 and extends between the inner liner 44 and the middle liner 42. A number of holes (not shown) are distributed around the circumference of the baffle 103 and divide the cooling air 66 into a number of jets that impinge on the outer surface of the inner liner 44, thereby cooling it. The air 66 then discharges into the secondary combustion zone 37.

As shown in FIG. 2, a dual fuel nozzle 18 is centrally disposed within the primary section 30 and receives liquid fuel 14' and gas fuel 16' for discharge into the primary combustion zone 36.

Figure 3:
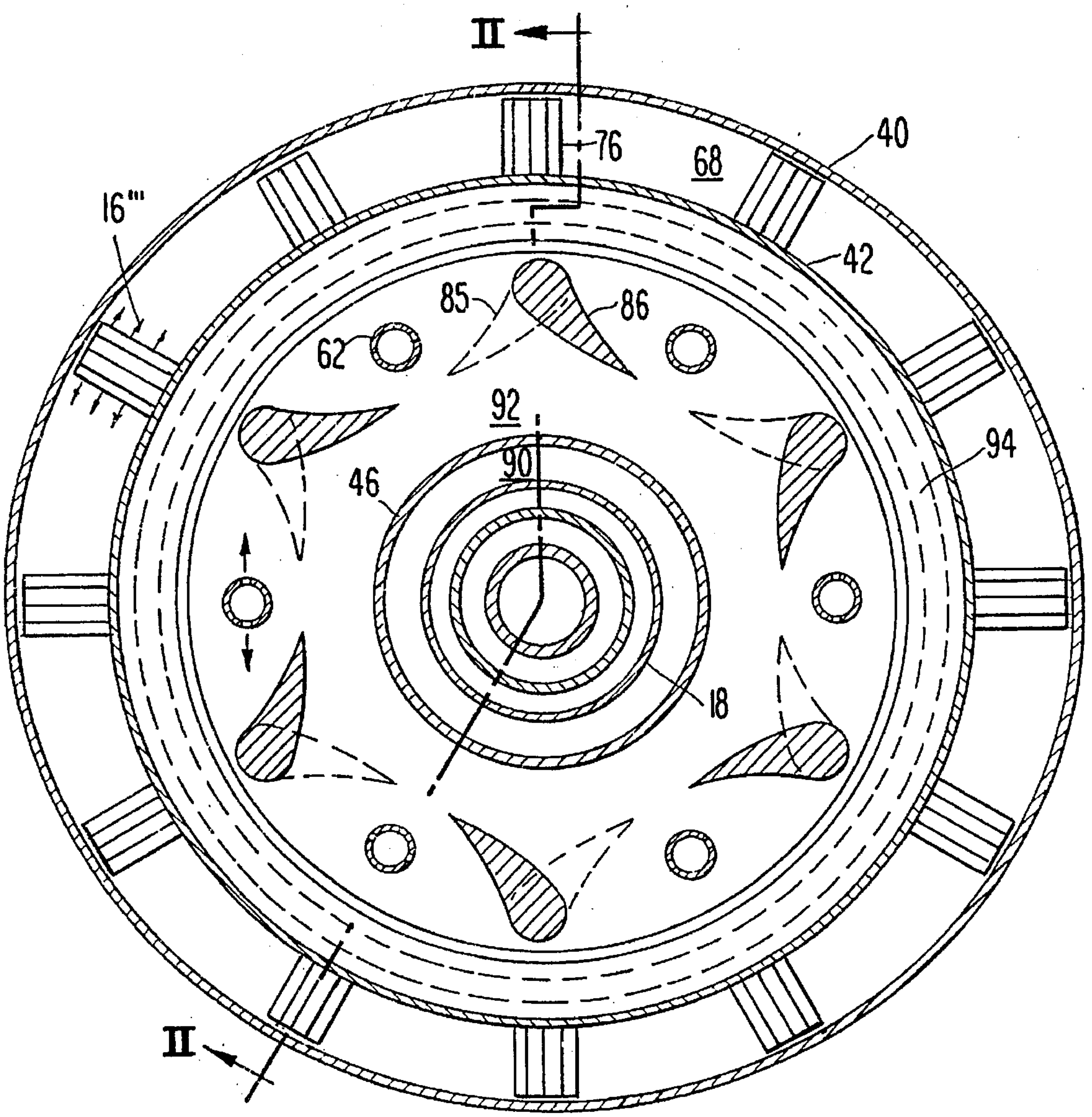
FIG. 3 is a transverse cross-section taken through lines III—III shown in FIG. 2.

Pre-mixing of gaseous fuel 16" and compressed air from the compressor 2 is accomplished for the primary combustion zone 36 by primary pre-mixing passages 90 and 92, which divide the incoming air into two streams 8' and 8". As shown in FIGS. 2 and 3, a number of axially oriented, tubular primary fuel spray pegs 62 are distributed around the circumference of the primary pre-mixing passages 90 and 92. Two rows of gas fuel discharge ports 64, one of which is shown in FIG. 2, are distributed along the length of each of the primary fuel pegs 62 so as to direct gas fuel 16" into the air steams 8' and 8" flowing through the passages 90 and 92. The gas fuel discharge ports 64 are oriented so as to discharge the gas fuel 16" circumferentially in the clockwise and counterclockwise directions—that is, perpendicular to the direction of the flow of air 8' and 8".

As also shown in FIGS. 2 and 3, a number of swirl vanes 85 and 86 are distributed around the circumference of the upstream portions of the passages 90 and 92. In the preferred embodiment, a swirl vane is disposed between each of the primary fuel pegs 62. As shown in FIG. 3, the swirl vanes 85 impart a counterclockwise (when viewed against the direction of the axial flow) rotation to the air stream 8', while the swirl vanes 86 impart a clockwise rotation to the air stream 8". The swirl imparted by the vanes 85 and 86 to the air streams 8' and 8" helps ensure good mixing between the gas fuel 16" and the air, thereby eliminating locally fuel rich mixtures and the associated high temperatures that increase NOx generation.

As shown in FIG. 2, the secondary combustion zone portion 37 of the combustion zone is formed within a liner 45 in the secondary section 32 of the combustor 2. The outer annular passage 68 discharges into the secondary combustion zone 37 and, according to the current invention, forms a fuel pre-mixing passage for the secondary combustion zone. The passage 68 defines a center line that is coincident with the axial center line 71. A portion 8'" of the compressed air 8 from the compressor section 2 flows into the passage 68.

As shown in FIGS. 2 and 3, a number of radially oriented secondary fuel spray bars 76 are circumferentially distributed around the secondary pre-mixing passage 68 and serve to introduce gas fuel 16'" into the compressed air 8'" flowing through the passage. This fuel mixes with the compressed air 8'" and is then delivered, in a well mixed form without local fuel-rich zones, to the secondary combustion zone 37.

Each of the fuel spray bars 76 is a radially oriented, aerodynamically shaped, elongate member that projects into the pre-mixing passage 68 from the liner 42, to which it is attached. As shown best in FIG. 5, according to the current invention, each of the spray bars 76 has an approximately airfoil shape with slightly curved opposing sides 83 and 84 that are connected by a leading edge 100 and trailing edge 101. The leading edge 100 is rounded, whereas the trailing edge 101 is relatively sharp—that is, the radius of curvature of the trailing edge is substantially less than that of the leading edge. This aerodynamically desirable shape minimizes the turbulence in the flow of air 8'" downstream of the spray bar 76.

Figure 6:
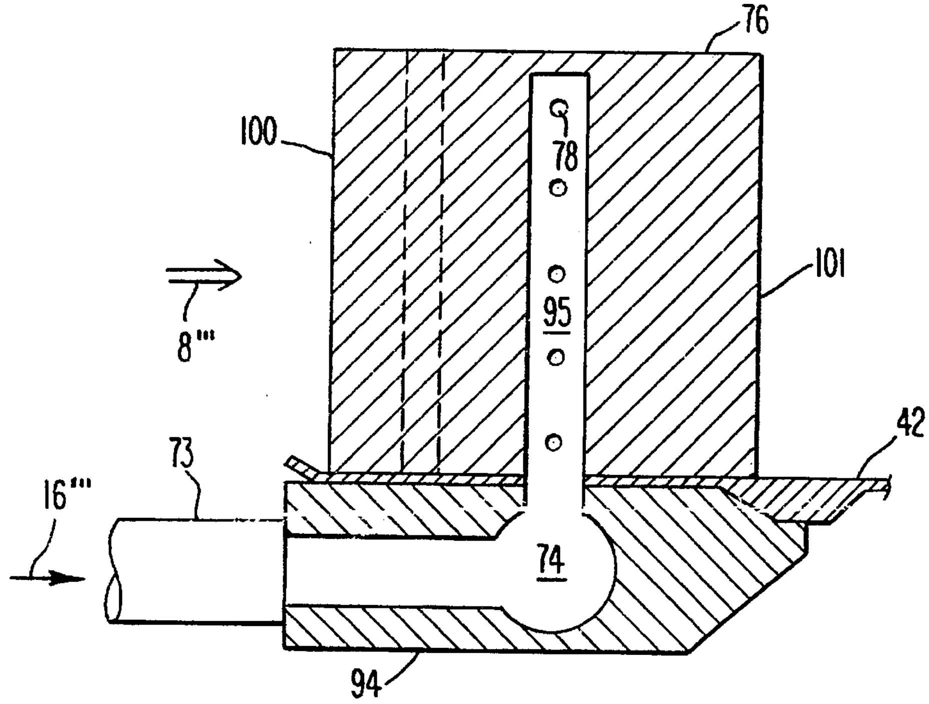
FIG. 6 is a cross-section taken through line VI—VI shown in FIG. 5.
Figure 5:
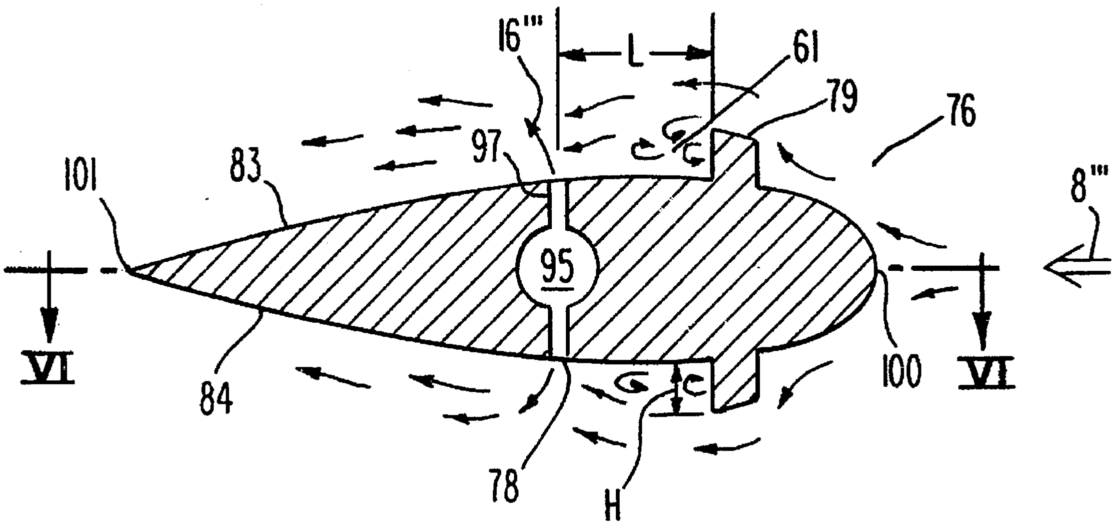
FIG. 5 is a cross-section through the spray bar shown in FIG. 4.

Gas fuel 16'" is supplied to the fuel spray bars 76 by a circumferentially extending gas fuel manifold 74 formed within the ring 94, as shown in FIG. 6. Several axially extending gas fuel supply tubes 73 are distributed around the manifold 74 and serve to direct the gas fuel 16'" to it. Passages 95 extend radially from the gas manifold 74 through each of the spray bars 76. Two rows of small gas fuel passages 97, each of which extends from the radial passage 95, are distributed over the length of each of the spray bars 76 along the opposing sides 83, 84 of the spray bars, as shown in FIG. 5. The radial passage 95 serves to distributes gas fuel 16'" to each of the small passages 97. The small passages 97 form discharge ports 78 on the sides 83 and 84 of the spray bar 76 that direct gas fuel 16'" into the air 8'" flowing through the secondary pre-mixing passage 68. As shown best in FIG. 3 and 5, the gas fuel discharge ports 78 are oriented so as to discharge the gas fuel 16'" circumferentially in both the clockwise and counterclockwise directions—that is, perpendicular to the direction of the flow of air 8'".

Figure 4:
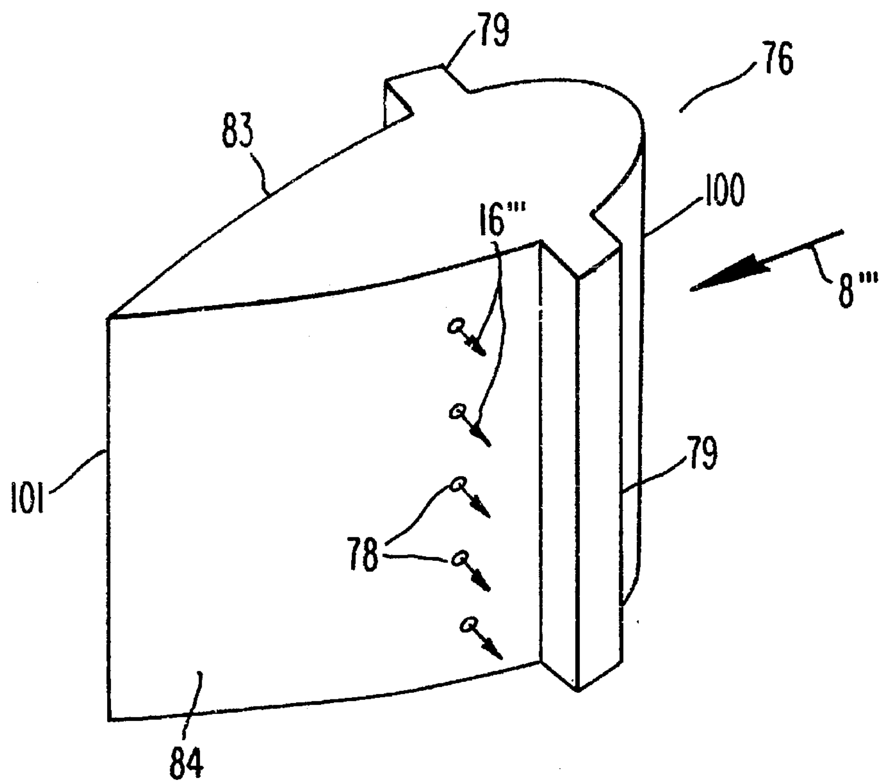
FIG. 4 is an isometric view of the spray bar of the current invention shown in FIGS. 2 and 3.

According to the current invention, mixing fins 79 project outwardly from each of the sides 83 and 84 of the fuel spray bars 76, as shown in FIGS. 4 and 5. According to an important aspect of the current invention, the mixing fins 79 are disposed between the leading edge 100 and the fuel discharge ports 78. As shown in FIG. 5, the mixing fins 79 induce turbulence in the compressed air 8''' flowing downstream of the fins. This turbulence ensures that the fuel 16''' discharged by the fuel ports 78 becomes well mixed with the compressed air 8'''. Although a zone of recirculating air 61 is created downstream of the mixing fins 79, as explained below, according to the current invention, the height H of the fins 79 and the distance L by which they are displaced from the fuel discharge port 78 is adjusted so that the recirculation zone 61 does not extend to the fuel discharge ports.

The height H by which the mixing fins 79 projects from the sides 83, 84 of the spray bars 76 should be great enough so that the fins create sufficient turbulence to ensure that the fuel 16''' is adequately mixed into the compressed air 8'''. However, the height of the fins 79 should not be so great that an undesirably large amount of turbulence is created. Specifically to be avoided is the creation of zones of recirculation 61 that extend downstream to the fuel discharge ports 78, since such recirculating flow can act as a flame holder that will cause a flame to become anchored to the spray bar 76. As previously discussed, this situation is undesirable since combustion within the pre-mixing passage 68 can damage the spray bars 76, as well as the liners 40 and 42.

The acceptable range of mixing fin heights is a function of the diameter of the fuel discharge ports 78 and the velocity of the air flow. In the preferred embodiment, the velocity of the air is approximately 60–105 m/sec (200–350 ft/sec) and the height H of the mixing fins 79 is at least about two times the diameter of the fuel discharge ports 78 but not more than about eight times the diameter of the fuel discharge ports. Shorter mixing fins 79 will create insufficient turbulence to achieve adequate mixing of the fuel 16''' and air 8'''; taller mixing fins will create a recirculation flow pattern that extends downstream to the fuel discharge ports 78.

The distance L by which the mixing fins 79 are displaced from the fuel discharge ports 78 in the axially upstream direction is also important. If the fins 79 are displaced too far upstream from the fuel discharge ports 78, the turbulence create by the fins will have substantially dissipated by the time the air flow reaches the fuel discharge ports, thereby undermining the purpose of the fins. On the other hand, if the fins 79 are placed too close to the fuel discharge ports 78, undesirable recirculation and flame anchoring are more likely to occur. Accordingly, the distance L is a function of the height H of the fins 79. Preferably, L is at least about four times the fin height but not more than about ten times the fin height.

During gas fuel operation, a flame is initially established in the primary combustion zone 36 by the introduction of gas fuel 16' via the central fuel nozzle 18. As increasing load on the turbine 6 requires higher firing temperatures, additional fuel is added by introducing gas fuel 16" via the primary fuel pegs 62. Since the primary fuel pegs 62 result in a much better distribution of the fuel within the air, they produce a leaner fuel/air mixture than the central nozzle 18 and hence lower NOx. Thus, once ignition is established in the primary combustion zone 36, the fuel to the central nozzle 18 can be shut-off. Further demand for fuel flow beyond that supplied by the primary fuel pegs 62 can then be satisfied by supplying additional fuel 16''' via the secondary fuel spray bars 76 of the current invention.

The present invention may be embodied in other specific forms without departing from the spirit or essential attributes thereof and, accordingly, reference should be made to the appended claims, rather than to the foregoing specification, as indicating the scope of the invention.

We claim:

1. A combustor comprising: a) an inlet for receiving compressed air; b) a combustion zone; and c) fuel pre-mixing means for pre-mixing a fuel into at least a first portion of said compressed air so as to form a fuel/air mixture and for subsequently introducing said fuel/air mixture into said combustion zone, said fuel pre-mixing means including:

(i) an annular passage in flow communication with said inlet and said combustion zone, whereby said first portion of said compressed air flows through said passage, and (ii) a plurality of members projecting substantially radially into said passage by a radial height, each of said members having (A) first and second opposing sides, (B) a first mixing fin having a downstream face projecting substantially perpendicularly from said first side of said member by a first distance and extending substantially radially along at least a portion of said radial height of said member, said mixing fin comprising a means for causing at least a portion of said compressed air to undergo turbulent recirculation, (C) a plurality of first fuel discharge ports spaced along and formed in said first side of said member, said first fuel discharge ports displaced from said first mixing fin in the downstream direction with respect to the flow of said first portion of said compressed air through said passage by a second distance.

2. The combustor according to claim 1, wherein:

a) said first fuel discharge ports have a diameter; and b) said first distance by which said first mixing fin extends outwardly from said first side is at least twice the diameter of said first fuel discharge ports.

3. The combustor according to claim 2, wherein said first distance by which said first mixing fin extends outwardly from said first side is no greater than eight times the diameter of said first fuel discharge ports.

4. The combustor according to claim 1, wherein said second distance by which said fuel discharge ports is displaced from said first mixing fin is at least four times said first distance by which said first mixing fin extends outwardly from said first side.

5. The combustor according to claim 4, wherein said second distance by which said fuel discharge port is displaced from said first mixing fin is no greater than ten times said first distance by which said first mixing fin extends outwardly from said first side.

6. The combustor according to claim 1, wherein each of said members has leading and trailing edges, said first and second opposing sides extending between said leading and trailing edges.

7. The combustor according to claim 6, wherein said leading edge is rounded, said trailing edge being sharper than said rounded leading edge.

8. The combustor according to claim 6, wherein each of said members further comprises:

a) a second mixing fin extending outwardly from said second side by said first distance;

b) a second fuel discharge port formed in said second side, said second fuel port displaced from said second mixing fin in the downstream direction with respect to the flow of said first portion of said compressed air through said passage by said second distance.

9. The combustor according to claim 8, wherein said first fuel discharge ports extend in a row on said first side of their respective member, and wherein each of said members further comprises additional second fuel discharge ports, said second fuel discharge ports extending in a row on said second side of said member.

10. The combustor according to claim 9, wherein each of said members has a fuel manifold formed therein, each of said fuel manifolds in flow communication with said first and second rows of fuel discharge ports of its respective member.

11. The combustor according to claim 1, wherein said passage is an annular passage formed between first and second concentrically arranged cylindrical liners, and wherein said members are dispersed around the circumference of said annular passage.

12. The combustor according to claim 1, wherein said combustion zone is a secondary combustion zone, and wherein said combustor further comprises (i) means for directing said first portion of said compressed air to said secondary combustion zone, (ii) a primary combustion zone in flow communication with said secondary combustion zone, and (iii) means for directing a second portion of said compressed air to said primary combustion zone, wherein fuel is combusted in said second portion of said compressed air in said primary combustion zone.

13. The combustor according to claim 1, wherein:

a) each of said fuel discharge ports has a diameter; and b) said first distance by which said mixing fins project from said first side of their respective member is no more than eight times said diameter of said fuel discharge ports.

14. The combustor according to claim 13, said first distance by which said mixing fins project from said first side of their respective member is at least twice said diameter of said fuel discharge ports.

15. The combustor according to claim 1, wherein said second distance by which said first fuel discharge ports are displaced from said first mixing fins is no greater than ten times said first distance by which said mixing fins project from said first side of their respective member.

16. The combustor according to claim 15, wherein said second distance by which said first fuel discharge ports are displaced from said first mixing fins is at least four times said first distance by which said mixing fins project from said first side of their respective member.

17. A combustor comprising:

a) an inlet for receiving a flow of compressed air;

b) a combustion zone; and c) fuel pre-mixing means for pre-mixing a fuel into at least a first portion of said flow of compressed air so as to form a fuel/air mixture and for subsequently introducing said fuel/air mixture into said combustion zone for combustion therein, said fuel pre-mixing means including:

(i) a passage in which said fuel is pre-mixed into said flow of compressed air;

(ii) means for introducing said fuel into said passage, said fuel introducing means including a member disposed in said passage and having leading and trailing edges and first and second opposing sides extending between said leading and trailing edges, said member oriented in said passage so that said flow of compressed air flows over said first and second sides of said member;

(iii) mixing fins extending outwardly from said first and second sides of said member; said mixing fins having downstream faces projecting substantially perpendicularly from said first and second sides of said member, said mixing fins comprising means for causing at least a portion of said flow of compressed air to undergo turbulent recirculation, (iv) first and second rows of fuel discharge ports extending along said first and second sides, respectively, and displaced from said mixing fins in the downstream direction with respect to the direction of flow of said air through said passage.

* * * * *